May 18, 1954  F. M. CLARK  2,679,027
MEASUREMENT OF DISSOLVED WATER CONTENT OF LIQUIDS
Filed May 21, 1951  2 Sheets-Sheet 1
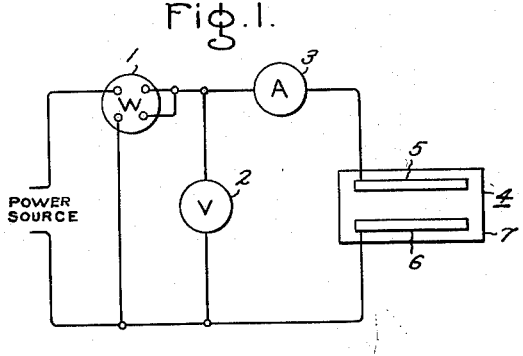
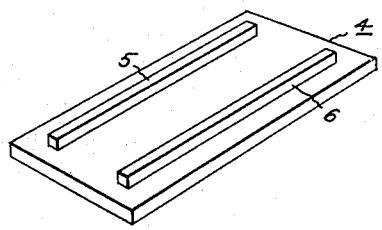
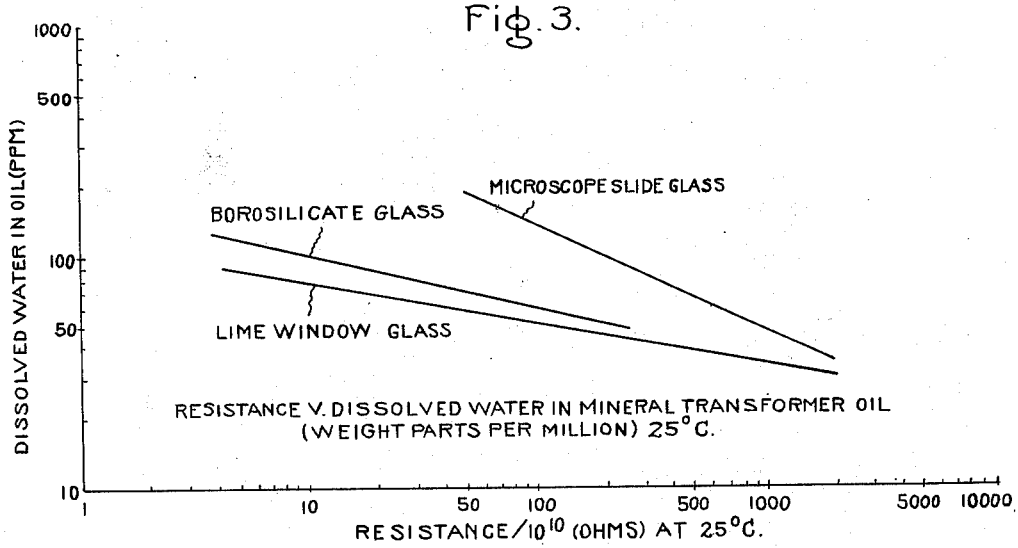
Inventor:
Frank M. Clark,
by Paul A. Frank
His Attorney.

May 18, 1954　　　F. M. CLARK　　　2,679,027
MEASUREMENT OF DISSOLVED WATER CONTENT OF LIQUIDS
Filed May 21, 1951　　　2 Sheets-Sheet 2
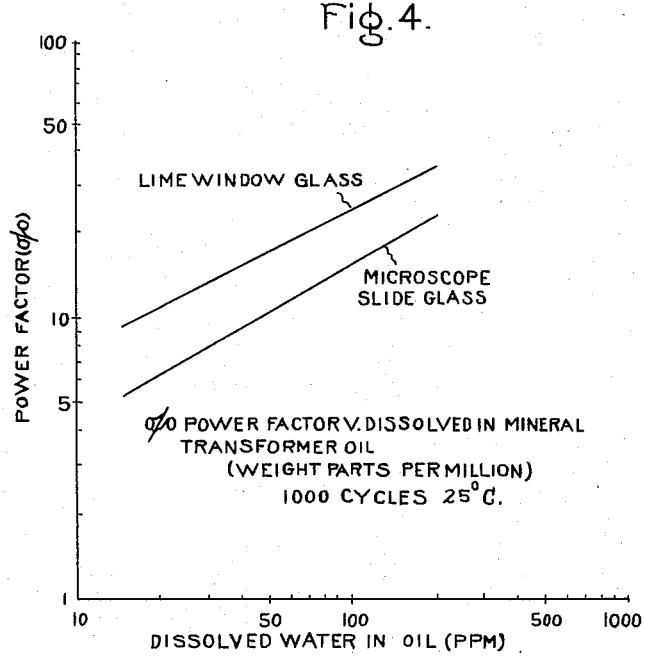
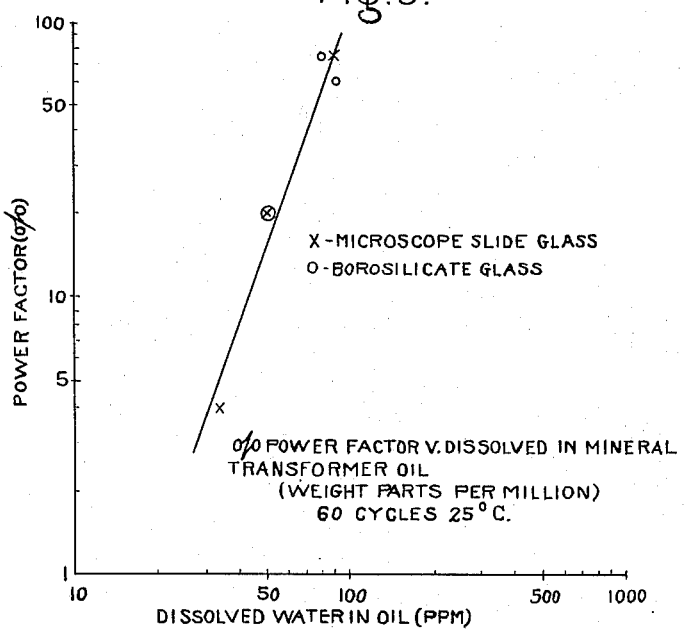
Inventor:
Frank M. Clark
by Paul A. Frank
His Attorney.

Patented May 18, 1954

2,679,027

UNITED STATES PATENT OFFICE 2,679,027

MEASUREMENT OF DISSOLVED WATER CONTENT OF LIQUIDS

Frank M. Clark, Schenectady, N. Y., assignor to General Electric Company, a corporation of New York Application May 21, 1951, Serial No. 227,474

5 Claims. (Cl. 324—65)

My invention relates to the measurement of the water content of liquids. More particularly, it relates to the measurement by electrical means of the amount of water present in solution in hydrocarbon liquids.

It is desirable to have means for quickly and accurately measuring the quantity of water dissolved in hydrocarbon liquids. This is especially true in those cases wherein the water content critically affects the use of the liquid and must be controlled. In particular, it is desirable that such means be provided to measure the water content of lubricating and electrically insulating hydrocarbon liquids such as mineral oil, and liquid halogenated hydrocarbons such as the askarels, among others. The term "hydrocarbon liquid" as used herein is intended to include the above materials. The amount of water in solution in liquid insulation in such apparatus as electrical transformers, liquid-filled cable, liquid-filled bushings in turbine oil lubricant systems, as well as in liquid storage facilities, is of importance in its effect on the lubricating or electrical characteristics of the liquid.

The presence of moisture dissolved in or in colloidal solution with electrical insulating liquids accelerates oxidation of oxidizable liquids, increases the likelihood of dielectric breakdown, increases the power factor and dielectric loss, and hastens mechanical aging of cellulosic insulation used in conjunction with the liquid. In lubricating liquids, the presence of moisture detracts from the lubricating qualities thereof. The presence of moisture in refrigerant system lubricants seriously affects the proper functioning of the refrigerant.

While a number of methods of evaluating dissolved water in liquid hydrocarbon lubricants or insulation exist, they do not lend themselves to quick, accurate, and simple determinations. In one method, a hot metal piece is plunged into the oil, the presence or absence of water in the oil being indicated by the nature of the crackling sounds produced. The inadequacy and inconvenience of such a test is obvious.

In another method, the dielectric strength of the oil is used as a measure of the dissolved water content. However, the dielectric strength of an oil is the net result of many factors, such as the presence of gas bubbles, gas in solution, the presence of fibers such as those of cellulose, and suspended dirt and other materials as well as the presence of moisture. Furthermore, the presence of fibers or other suspended materials has a greater effect on the dielectric strength than water alone. While dielectric strength gives a practical over-all indication of the usability of a liquid for electrical purposes, it cannot be used as a precise or analytical tool for the measurement of dissolved water content.

Other methods of determining dissolved water content of such liquids include measurement of the gas evolved when a reagent, such as sodium or certain metal hydrides, such as lithium hydride, are reacted with the contained water. Such procedure is at best for laboratory use and is inadequate for general use. The so-called "Karl Fischer Method" is another test for laboratory use in which light colored liquids are dissolved in benzene and methanol and titrated to a color change end point with iodine which is dissolved in methanol and reacted with pyridine and sulfur dioxide.

Still other methods which have been proposed for the determination of dissolved water include removal of the water with a dry gas, removal by refrigerating, by condensing means, or by absorption in such media as phosphorous pentoxide and the like.

The tests mentioned above are all characterized by practical disadvantages which detract from their accuracy or ready use in the field or at the site of operations.

An object of my invention is to provide accurate means for determining the amount of dissolved water in hydrocarbon liquids.

Another object of my invention is to provide accurate means for the determination of the dissolved water content of hydrocarbon liquids which is simple and adapted for field use.

Other objects will become apparent from a consideration of the following description.

In accordance with my invention, the surface resistance or power factor of the inter-electrode surface of a glass plate immersed in the liquid to be tested is measured and compared with the value obtained in a standard liquid having a known amount of water in solution.

My invention will be better understood from the following description taken in connection with the accompanying drawings. In the drawing, Fig. 1 shows a typical electrical circuit which may be used in connection with my invention; Fig. 2 is an enlarged view of the sensitive element shown in Fig. 1; Fig. 3 is a plot of resistance vs. the amount of dissolved water in oil for various glasses; Fig. 4 is a plot of the 1000 cycle power factor vs. the amount of dissolved water in mineral transformer oil for several glasses and Fig. 5 is a plot of the 60 cycle power factor vs. the amount of dissolved water in mineral transformer oil for similar glasses.

I have found that the electrical surface leakage of glass is very sensitive to changes in the dissolved water or moisture content of liquids in which it may be immersed. While I do not base the practical results of my invention on any particular theory, it is my belief that the constituents of the glass combine rapidly with the dissolved water to form a hydrate, the amount and chemical constitution of which is in equilibrium with and determined by the amount of moisture in the liquid. This equilibrium is reflected in the electrical conductivity of the glass surface. This equilibrium is further unstable and changes rapidly as the dissolved water content of the immersion liquid is changed. It is, of course, understood that the present method is not applicable to liquids having water in physical suspension, such water being removed as by filtering or other means. As the equilibrium shifts to correspond to an increased water content, the electrical conductivity of the surface increases, increased water content thus being reflected in a lower resistance and a higher power factor. By standardizing a particular glass immersion element to obtain the variations in power factor or resistance with a known change in water content of a liquid, the amount of water in any similar liquid may be determined by immersing the element in the liquid to be tested and measuring the power factor or resistance of the element surface.

Typical apparatus for carrying out my invention is shown in Fig. 1, in which a power source is connected in circuit with wattmeter 1, voltmeter 2, and ammeter 3, to measure the electrical characteristics of that portion of test element 4 which lies between electrodes 5 and 6, fixed to glass base 7. The glass base 7 may be of any type glass, since the relation between the water content of the liquid and the electrical characteristics of the surface are standardized for each particular glass base composition used. Glasses which are typically used are lime window glass, microscope slide glass, and borosilicate glass, among others. The thickness of the base is of no analytical import, any convenient thickness being usable. An exemplary glass base is about 2½ inches long, 1½ inches wide, and from 0.050 to 0.175 inch thick.

The measuring electrodes likewise may be of any convenient size and of any desired standardized spacing. Rods about ¼ inch square and 2 inches long spaced 6 mm. apart give satisfactory test results with a glass base of the above size and such an element was used in the tests described herein. The preferred electrode material is copper, which should be plated with a liquid-inert material. In the case of most liquids, a nickel or tin plate is preferred, though others will occur to those skilled in the art. The plate also eliminates any catalytic action which the copper may have on the oxidation of liquids such as mineral oil.

The electrodes may be fixed to the glass base in any desired manner so long as good electrical contact is established therewith. Soldering, cementing with conductive pastes, and electrodeposition are typical of the methods which may be used.

I have found it convenient in this invention to use two protectively plated copper electrodes ¼ inch square in cross-section and 2 inches long, and spaced 6 mm. apart. This, however, is not to be taken as a limitation as to the size, composition or spacing of the electrodes since they may be of any size, composition and spacing so long as these factors are maintained constant in any one test or series of tests which are to be compared one with the other. In order to obtain exact measurements, it is necessary that the test piece or element, consisting of glass base and electrodes, be thoroughly cleaned. One method of cleaning is as follows. The element is washed with soap and water and then with benzene and acetone, care being taken to avoid contamination of the element and especially the test area between the electrodes. Finally, the element is rinsed with ether, air dried, dried in an oven at 100° C. for at least three hours, and cooled in a desiccator. It is then immersed in the liquid of the type in which it is to be used, and allowed to stand for at least twenty-four hours before use. The element or elements may also be stored in such liquid and transported as desired. The only limitation on the storage liquid is that it should be of normally good commercial grade.

When it is desired to use the element, it is removed from the storage liquid and placed at once in the liquid to be tested. If a series of samples of a like liquid are to be examined successively, no cleaning of the test element is required between tests, the element being merely transferred from one liquid sample to the other. Although I have not observed any deleterious effect from exposure of the element to air, I prefer to avoid or reduce it as much as possible.

The measurement of the electrical characteristics of the inter-electrode surface of the element may be made at any convenient time after immersion of the element in the liquid. While I prefer to make the measurement after an immersion of about five minutes or shorter, pretest immersion periods are not seen to have an effect on the results obtained. For example, in testing mineral transformer oil containing thirty-five weight parts per million of dissolved water, the resistance reading remained unchanged after immersion times varying from one to sixty minutes. The electrical surface characteristics vary promptly in accordance with the moisture content of the liquid to give quick-response, continuous recording of the condition of a liquid, as for example in a storage tank, an electrical transformer or a reservoir for a liquid-filled cable.

I prefer to measure the effects of dissolved water at room temperature, and this is most convenient for storage tanks and certain types of electrical equipment. In those cases wherein measurements are to be made at higher temperatures including continuously recorded measurements, the elements must be or have been calibrated for the particular temperature due to the shift of the equilibrium conditions between the glass and the liquid with change in temperature.

Typical data obtained under various conditions using mineral transformer oil as the liquid are shown in Figs. 3 through 5. While the present test data are directed to a mineral transformer oil, the methods and apparatus described herein have been and are used in conjunction with halogenated hydrocarbons as well as other hydrocarbon base liquids, the test elements being standardized with each new type of liquid. The test method is also applicable to old and used oils containing oxidized and other contaminating material.

Fig. 3 shows that as the water content of mineral transformer oil is increased from about thirty weight parts per million to about ninety weight parts per million, the resistance of a lime window glass element surface varies from about $2000 \times 10^{10}$ ohms to about $10 \times 10^{10}$ ohms at 25° C. Variations in resistance are also shown for borosilicate glass and microscope slide glass. Knowing the variation in resistance with a particular element, the resistance of any sample of mineral oil may be measured, using the circuit of Fig. 1 or any equivalent circuit with the same element, and its dissolved water content read from the standard plot. It will be understood that the measurements described above can be made at any desired frequency or voltage.

While any glass composition may be used in the test element, the weight analyses of those used in obtaining the presented data are:

*Microscope slide glass*

| | Per cent |
|---|---|
| Soda | 12–15 |
| Lime | 12–14 |
| Alumina | 1–2 |
| Silica | 75–79 |

*Lime window glass*

| | |
|---|---|
| Silica | 72 |
| Sodium oxide | 15 |
| Calcium oxide | 9 |
| Magnesium oxide | 3 |
| Alumina | 1 |

*Borosilicate glass*

| | |
|---|---|
| Sodium oxide | 3.8 |
| Potassium oxide | 0.4 |
| Boric oxide | 12.9 |
| Alumina | 2.2 |
| Silica | 80.5 |

The power factor of the inter-electrode surface of the elements is also useful as an indication of the amount of dissolved water in the various liquids. The power factor may be simply found by dividing the reading of the watt-meter 1 by the product of the readings of voltmeter 2 and ammeter 3. Fig. 4 shows the variation at 1000 cycles of the power factor of mineral transformer oil with increasing dissolved water content, using a lime window glass and microscope slide glass elements. Using such glass elements the dissolved water content of any unknown sample of the mineral oil can be determined by finding its 1000 cycle power factor and reading the corresponding water content from the plot.

Because of the more rapid change of the 60 cycle power factor with water content as compared with the 1000 cycle power factor, the 60 cycle measurement illustrated in Fig. 5 is preferred. Here there is also very little difference in readings between the two types of glass employed in the element.

By the teachings presented herein, the electrical characteristics of a glass surface may be utilized to determine the dissolved water content of various liquids. Such determinations may be either in the nature of batch testing or continuously recorded measurements.

What I claim as new and desire to secure by Letters Patent of the United States is:

1. The method of determining the dissolved water content of a hydrocarbon liquid which comprises measuring the electrical characteristics of a circuit which includes a glass surface immersed in said liquid.

2. The method of determining the dissolved water content of a hydrocarbon liquid which comprises measuring the resistance of a glass surface immersed in said liquid.

3. The method of determining the dissolved water content of a hydrocarbon liquid which comprises measuring an electrical characteristic of a glass surface immersed in said liquid and comparing it with the values obtained when a similar glass surface is immersed in a similar liquid having known amounts of dissolved water.

4. The method of determining the dissolved water content of a hydrocarbon liquid which comprises measuring the resistance characteristic of a glass surface immersed in said liquid and comparing it with the values obtained when a similar glass surface is immersed in a similar liquid having known amounts of dissolved water.

5. The method of determining the dissolved water content of a hydrocarbon liquid which comprises immersing in the liquid a glass plate, measuring an electrical characteristic of the glass surface when it is connected in series circuit, and comparing the magnitude of said electrical characteristic with values obtained when a similar glass plate is immersed in a similar liquid having known amounts of dissolved water.

References Cited in the file of this patent

UNITED STATES PATENTS

| Number | Name | Date |
|---|---|---|
| 1,215,150 | Hendricks, Jr. | Feb. 6, 1917 |
| 1,391,041 | Boon et al. | Sept. 20, 1921 |
| 1,721,374 | Dantsizen | July 16, 1929 |
| 2,015,125 | Polin | Sept. 24, 1935 |
| 2,424,735 | Boothroyd | July 29, 1947 |
| 2,435,895 | McIlvaine | Feb. 10, 1948 |